United States Patent
Lee

(10) Patent No.: US 10,658,955 B2
(45) Date of Patent: May 19, 2020

(54) SENSORLESS CONTROL SYSTEM FOR PERMANENT MAGNET SYNCHRONOUS MACHINE

(71) Applicant: LSIS CO., LTD, Gyeonggi-do (KR)

(72) Inventor: Hak-Jun Lee, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 45 days.

(21) Appl. No.: 15/461,599

(22) Filed: Mar. 17, 2017

(65) Prior Publication Data

US 2018/0123488 A1    May 3, 2018

(30) Foreign Application Priority Data

Oct. 27, 2016    (KR) .................. 10-2016-0140749

(51) Int. Cl.
| | |
|---|---|
| *H02P 21/13* | (2006.01) |
| *H02P 6/182* | (2016.01) |
| *H02P 23/12* | (2006.01) |
| *H02P 6/18* | (2016.01) |
| *H02P 25/03* | (2016.01) |
| *H02P 6/17* | (2016.01) |

(52) U.S. Cl.
CPC ............... *H02P 6/182* (2013.01); *H02P 6/17* (2016.02); *H02P 6/181* (2013.01); *H02P 21/13* (2013.01); *H02P 23/12* (2013.01); *H02P 25/03* (2016.02)

(58) Field of Classification Search
CPC .......... H02P 21/13; H02P 23/12; H02P 21/18; G05B 2219/42078; G05B 2219/41367
See application file for complete search history.

(56) References Cited

U.S. PATENT DOCUMENTS

| | | | | |
|---|---|---|---|---|
| 6,462,491 | B1 * | 10/2002 | Iijima ....................... | H02P 9/18 |
| | | | | 318/400.09 |
| 9,143,066 | B2 * | 9/2015 | Yang ........................ | H02P 6/18 |

(Continued)

FOREIGN PATENT DOCUMENTS

| | | |
|---|---|---|
| JP | 2001251889 A | 9/2001 |
| JP | 2010259130 A | 11/2010 |
| JP | 2015093197 A | 5/2015 |

(Continued)

OTHER PUBLICATIONS

European Search Report Application No. 17159596.0 dated Oct. 5, 2017—9 pages.

(Continued)

*Primary Examiner* — Bickey Dhakal
(74) *Attorney, Agent, or Firm* — K&L Gates LLP

(57) ABSTRACT

Disclosed is a sensorless control system for a permanent magnet synchronous machine. The sensorless control system includes a counter electromotive force estimation unit configured to estimate a counter electromotive force using a phase voltage reference applied to an inverter and a phase current applied from the inverter to the permanent magnet synchronous machine, and a speed estimation unit configured to estimate an angular velocity and an electrical angle of a rotor of the permanent magnet synchronous machine, and the counter electromotive force estimation unit according to one embodiment of the present disclosure may maintain robust performance at a low speed by modifying some portion of a conventional Luenberger observer.

7 Claims, 11 Drawing Sheets

(56) References Cited

U.S. PATENT DOCUMENTS

2017/0070173 A1* 3/2017 Lee .................. H02P 21/34
2017/0126153 A1* 5/2017 Lepka .................. H02P 29/021

FOREIGN PATENT DOCUMENTS

| | | | |
|---|---|---|---|
| JP | 2015171241 | A | 9/2015 |
| JP | 2015223023 | A | 12/2015 |
| JP | 5952332 | B2 | 7/2016 |
| KR | 20130084843 | | 7/2013 |
| KR | 101426485 | B1 | 8/2014 |
| KR | 101498003 | B1 | 3/2015 |

OTHER PUBLICATIONS

Luenberger state observer Rotor position estimation simulink and software library, Apr. 2005, Rev—pp. 1-25.

Zou, SRF-PLL Based Sensor-Less Control Strategy Using Improved Dead-beat Controller for Direct-driven Permanent Magnet Synchronous Generator (PMSG), National Basic Research Program of China (973), 978-1-4673-4355-8/13 (2013), pp. 2984-2989.

Chen, "Sensorless Control of Permanent Magnet Synchronous Machines With Multiple Saliencies," Dissertation dated Dec. 21, 2015, Univ.Prof. Dr.-Ing. Ralph Kennel (Technischen Universitat munchenand) and Prof. Silverio Bolognani (Universitat Padua, Italien)—146 pages.

Cacciato, et al. "Comparison of Low-Cost-Implementation Sensorless Schemes in Vector Controlled Adjustable Speed Drives," International Symposium on Power Electronics, Electrical Drives, Automation and Motion, SPEEDAM 2008, 978-1-4244-1664-6/08—pp. 1082-1087.

Japanese Office Action for related Japanese Application No. 2017-049025; action dated Apr. 3, 2018; (3 pages).

* cited by examiner

SENSORLESS CONTROL SYSTEM FOR PERMANENT MAGNET SYNCHRONOUS MACHINE

CROSS-REFERENCE TO RELATED APPLICATIONS

This application claims the priority of Korean Patent Application No. 10-2016-0140749 filed on Oct. 27, 2016, in the Korean Intellectual Property Office, the disclosure of which is hereby incorporated by reference in its entirety.

BACKGROUND

1. Technical Field

The present disclosure relates to a sensorless control system for a permanent magnet synchronous machine.

2. Description of the Related Art

A permanent magnet synchronous machine (PMSM) has high efficiency, high torque and output per unit volume, and a fast-dynamic characteristic so that it has been mainly used in high-performance servo application field.

In such a permanent magnet synchronous machine, a rotor magnetic flux is generated from a permanent magnet attached to a rotor so that an absolute position of a magnetic flux generated from the permanent magnet, that is, an absolute position of the rotor should be exactly determined so as to instantaneously exactly control torque that is generated from the permanent magnet synchronous machine. Therefore, in the related art, an absolute position of a rotor is detected and then used in a field-oriented control upon control of a permanent magnet synchronous machine. However, a rotor speed and position detector such as an encoder or a resolver causes problems in that a cost and a volume of a system are increased and reliability thereof is degraded.

To address the above described problems of the related art, a control method of obtaining position information of a rotor without using a speed and position detector, that is, a sensorless control is employed.

Hereinafter, a vector control using a rotor speed and position detector such as a conventional encoder will be described and then a sensorless control method will be described.

FIG. 1 is a schematic circuit diagram of a 2-level three-phase source inverter used for driving a machine, and a voltage $V_{dc}$ of a direct current (DC) link 101 is applied to three-phase power switches 102 and then a voltage, which is converted into an alternating current (AC) by the three-phase power switches 102, is applied to a load 103.

n indicates a position of an imaginary neutral point in the DC link 101, and $S_a$, $S_b$ and $S_c$ respectively indicate switching functions of power switches in the three-phase power switches 102. That is, $S_a=1$ refers to that an a-phase top switch is conducting, and $S_a=0$ refers to that an a-phase bottom switch is conducting. In other words, $S_a$ and $\overline{S_a}$ have a complementary relationship.

FIG. 2 is a diagram for describing a pole voltage that is applied to a triangular wave comparison voltage modulation for controlling the three-phase power switches 102 by an inverter.

An offset voltage reference calculation unit 202 calculates an offset voltage reference using three-phase phase voltage references 201, and three-phase pole voltage references 204 are obtained by adding the phase voltage references 201 to an output of the offset voltage reference calculation unit 202 through an adding unit 203 and satisfy the following Equation.

$$v^*_{an}=v^*_{as}+v^*_{sn}$$
$$v^*_{bn}=v^*_{bs}+v^*_{bn}$$
$$v^*_{cn}=v^*_{cs}+v^*_{cn} \quad \text{[Equation 1]}$$

An offset voltage is a component that commonly exists in three-phase pole voltages and refers to a zero sequence voltage so that it does not affect synthesis of line-to-line voltages. The offset voltage reference calculation unit 202 may calculates the offset voltage through various methods, and the two following methods are representatively known.

In a sinusoidal pulse width modulation (SPWM), an offset voltage is as follows.

$$v^*_{sn}=0 \quad \text{[Equation 2]}$$

In a spacial vector PWM (SVPWM), an offset voltage is as follows.

$$v^*_{sn}=-\frac{v_{max}+v_{min}}{2} \quad \text{[Equation 3]}$$

Here, $v_{max}$ refers to a largest voltage among the three-phase phase voltage references, and $v_{min}$ refers to a smallest voltage thereamong.

FIG. 3 is an exemplified diagram for describing a triangular wave comparison voltage modulation.

A comparison unit 303 compares the three-phase pole voltage references 240, which are determined as in FIG. 2, with a triangular carrier wave. At this point, a period of the triangular carrier wave is the same as that of a switching frequency, and a maximum value and a minimum value of the triangular carrier wave are $V_{dc}/2$ and $-V_{dc}/2$, respectively.

The comparison unit 303 outputs a switching function of 1 when a difference between the three-phase pole voltage references 240 and the triangular carrier wave is a positive value, and a switching function of 0 when the difference between the three-phase pole voltage references 240 and the triangular carrier wave is a negative value. When the triangular carrier wave is defined as $v_{tri}$, each of the switching functions is arranged as follows.

$$\begin{cases} S_a=1, & v^*_{an} \geq v_{tri} \\ S_a=0, & v^*_{an} < v_{tri} \end{cases} \quad \text{[Equation 4]}$$

$$\begin{cases} S_b=1, & v^*_{bn} \geq v_{tri} \\ S_b=0, & v^*_{bn} < v_{tri} \end{cases} \quad \text{[Equation 5]}$$

$$\begin{cases} S_c=1, & v^*_{cn} \geq v_{tri} \\ S_c=0, & v^*_{cn} < v_{tri} \end{cases} \quad \text{[Equation 6]}$$

A switching function of a bottom switch operates complementary to a switching function of a top switch so that the switching function of the top switch is output when the switching function of the bottom switch passes through an NOT circuit 304.

FIG. 4 is a configuration diagram for describing a conventional control system of a permanent magnet synchronous machine.

To follow up a speed reference of $\omega^*_{rm}$ the permanent magnet synchronous machine, a speed control unit 410 receives a speed $\omega_{rm}$ from a position sensor 460 such as a resolver or an encoder and uses the received speed $\omega_{rm}$ in a control operation. A current control unit 420 receives a dq-axis current $i_{dqs}^{e}$ of the permanent magnet synchronous machine and uses the received dq-axis current $i_{dqs}^{e}$ in a control operation so as to follow up a dq-axis current reference $i_{dqs}^{e*}$ in a synchronous reference frame, which is received from the speed control unit 410. An output of the current control unit 420 is a dq-axis voltage reference $v_{dqs}^{e*}$ in the synchronous reference frame. At this point, the current reference may be represented as $$i_{dqs}^{e*} = \begin{bmatrix} i_{ds}^{e*} \\ i_{qs}^{e*} \end{bmatrix},$$

and a measured current may be represented as $$i_{dqs}^{e} = \begin{bmatrix} i_{ds}^{e} \\ i_{qs}^{e} \end{bmatrix}.$$

A first reference frame transformation unit 430 transforms a dq-axis physical amount into an abc-phase physical amount in the synchronous reference frame, and uses the following Equation so as to transform $v_{dqs}^{e*}$ into $v^*_{abcs}$. At this point, $$v_{dqs}^{e*} = \begin{bmatrix} v_{ds}^{e*} \\ v_{qs}^{e*} \end{bmatrix} \quad \text{[Equation 7]}$$

and $$v^*_{abcs} = \begin{bmatrix} v^*_{as} \\ v^*_{bs} \\ v^*_{cs} \end{bmatrix}.$$

$$\begin{bmatrix} v^*_{as} \\ v^*_{bs} \\ v^*_{cs} \end{bmatrix} = \begin{bmatrix} 1 & 0 \\ -\frac{1}{2} & \frac{\sqrt{3}}{2} \\ -\frac{1}{2} & -\frac{\sqrt{3}}{2} \end{bmatrix} \begin{bmatrix} \cos\theta_e & -\sin\theta_e \\ \sin\theta_e & \cos\theta_e \end{bmatrix} \begin{bmatrix} v_{ds}^{e*} \\ v_{qs}^{e*} \end{bmatrix}$$

Here, $\theta_e$ is an electrical angle that is measured by a position sensor 460.

Meanwhile, a second reference frame transformation unit 435 transforms an input $i_{abcs}$ into $i_{dqs}^{e}$ using the following Equation. At this point, $$i_{dqs}^{e*} = \begin{bmatrix} i_{ds}^{e*} \\ i_{qs}^{e*} \end{bmatrix} \quad \text{[Equation 8]}$$

and $$i_{abcs} = \begin{bmatrix} i_{as} \\ i_{bs} \\ i_{cs} \end{bmatrix}.$$

$$\begin{bmatrix} i_{ds}^{e} \\ i_{qs}^{e} \end{bmatrix} = \frac{2}{3}\begin{bmatrix} \cos\theta_e & \sin\theta_e \\ -\sin\theta_e & \cos\theta_e \end{bmatrix} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} i_{as} \\ i_{bs} \\ i_{cs} \end{bmatrix}$$

Here, as in Equation 7, $\theta_e$ is an electrical angle that is measured by the position sensor 460. A PWM control unit 440 converts abc-phase voltage references $v^*_{abcs}$ into pole voltage references and then provides the pole voltage references to an inverter 450. An operation of the PWM control unit 440 is the same as that described with reference to FIG. 2. Here, $$v^*_{abcn} = \begin{bmatrix} v^*_{an} \\ v^*_{bn} \\ v^*_{cn} \end{bmatrix}.$$

The inverter 450 synthesizes the pole voltage references $v^*_{abcn}$, which are received from the PWM control unit 440, as pole voltages. A configuration of the inverter 450 is the same as that described with reference to FIGS. 1 and 3. The pole voltage references are applied to the inverter 450 of FIG. 4 in the form of the switching function through the triangular wave comparison voltage modulation of FIG. 3.

The pole voltage references $v^*_{abcn}$ are synthesized as actual pole voltages $v_{abcn}$ through the inverter 450. At this point, $$v_{abcn} = \begin{bmatrix} v_{an} \\ v_{bn} \\ v_{cn} \end{bmatrix}.$$

However, such a control system according the related art has problems in that the system is high in price and is increased in volume due to the position sensor 460, and reliability of the system is degraded due to an incorrect operation of the position sensor 460.

Therefore, to address the above described problems, a sensorless control system shown in FIG. 5 is disclosed. FIG. 5 is a configuration diagram for describing a conventional sensorless control system for a permanent magnet synchronous machine, configurations of a speed estimation unit 510 and a counter electromotive force estimation unit 520 are different from those of FIG. 4 and other configurations are the same as those thereof.

The speed estimation unit 510 estimates an angular velocity and an electrical angle based on a counter electromotive force $\hat{E}_{dq}$ that is estimated from the counter electromotive force estimation unit 520, and the counter electromotive force estimation unit 520 estimates the counter electromotive force using the abc-phase voltage references $v^*_{abcs}$ and the abc-phase currents $i_{abcs}$.

In the sensorless control system of the related art, a counter electromotive force full-order observer is configured to estimate a counter electromotive force. To simplify a configuration and a gain of the observer, a magnetic flux component not a current, which is configured with a product of inductance and the current as Equation 9, is used as a state variable.

$$x_{dqs}^{e} = \begin{bmatrix} x_{ds}^{e} \\ x_{qs}^{e} \end{bmatrix} = \begin{bmatrix} L_{ds} & 0 \\ 0 & L_{qs} \end{bmatrix} i_{dqs}^{e} = \begin{bmatrix} L_{ds} & 0 \\ 0 & L_{qs} \end{bmatrix} \begin{bmatrix} i_{ds}^{e} \\ i_{qs}^{e} \end{bmatrix} \quad \text{[Equation 9]}$$

A voltage equation in an estimated synchronous reference frame is as follows.

$$v_{dqs}^e = \begin{bmatrix} R_s + pL_{ds} & -\hat{\omega}_r L_{qs} \\ \hat{\omega}_r L_{ds} & R_s + pL_{qs} \end{bmatrix} i_{dqs}^e + \hat{\omega}_r \lambda_{PM} \begin{bmatrix} -\sin\Delta\theta \\ \cos\Delta\theta \end{bmatrix}$$ [Equation 10]

In Equations 9 and 10, $R_s$ indicates a phase resistance of a three-phase permanent magnet synchronous machine 470, $L_{ds}$ indicates a d-axis inductance in the synchronous reference frame, $L_{qs}$ indicates a q-axis inductance in the synchronous reference frame, $\hat{\omega}_r$ indicates an estimated angular velocity of the three-phase permanent magnet synchronous machine 470, and $\lambda_{PM}$ indicates a counter electromotive force constant of the three-phase permanent magnet synchronous machine 470. p indicates a differential operator, and $\Delta\theta$ indicates an angular error between an actual angle and an estimated angle.

Using Equation 10, a state equation is arranged as follows.

$$p\begin{bmatrix} \hat{x}^e_{dqs} \\ \hat{E}^e_{dqs} \end{bmatrix} = A \begin{bmatrix} \hat{x}^e_{dqs} \\ \hat{E}^e_{dqs} \end{bmatrix} + B(v^e_{dqs} - R_s i^e_{dqs})$$ [Equation 11]

$$x^e_{dqs} = C\begin{bmatrix} x^e_{dqs} \\ E^e_{dqs} \end{bmatrix}$$

In Equation 11, it is indicated that $$A = \begin{bmatrix} -J\hat{\omega}_r & -I \\ 0 & 0 \end{bmatrix}, B = \begin{bmatrix} I \\ 0 \end{bmatrix}, C = [I\ 0],$$

$$I = \begin{bmatrix} 1 & 0 \\ 0 & 1 \end{bmatrix}, \text{ and } J = \begin{bmatrix} 0 & -1 \\ 1 & 0 \end{bmatrix}.$$

Using Equation 11, a full-order Luenberger observer is configured as follows.

$$p\begin{bmatrix} \hat{x}^e_{dqs} \\ \hat{E}^e_{dqs} \end{bmatrix} = \begin{bmatrix} -J\hat{\omega}_r & -I \\ 0 & 0 \end{bmatrix}\begin{bmatrix} \hat{x}^e_{dqs} \\ \hat{E}^e_{dqs} \end{bmatrix} + \begin{bmatrix} I \\ 0 \end{bmatrix}(v^e_{dqs} - R_s i^e_{dqs}) + L(x^e_{dqs} - \hat{x}^e_{dqs})$$ [Equation 12]

At this point, an L matrix refers to a gain of the full-order Luenberger observer. An observer gain L in a counter electromotive force estimation unit in the form of the full-order Luenberger observer may be represented as follows.

$$L = \begin{bmatrix} g_{11} & \hat{\omega}_r \\ -\hat{\omega}_r & g_{12} \\ -g_{21} & 0 \\ 0 & -g_{22} \end{bmatrix}$$ [Equation 13]

FIG. 6 is a detailed configuration diagram of a counter electromotive force estimation unit in the form of a conventional Luenberger observer.

A first adding unit 601 calculates and outputs $(x^e_{dqs} - \hat{x}^e_{dqs})$. A first gain applying unit 602 applies a gain $$G_1 = \begin{bmatrix} g_{11} & 0 \\ 0 & g_{12} \end{bmatrix},$$

which is adjustable by a user, among gains L to an output of the first adding unit 601 and outputs the result. A second gain applying unit 603 applies $$J\hat{\omega}_r = \begin{bmatrix} 0 & -\hat{\omega}_r \\ \hat{\omega}_r & 0 \end{bmatrix}$$

among the gains L to the output of the first adding unit 601 and outputs the result. Also, a first gain applying unit 606 applies a gain $$G_2 = \begin{bmatrix} g_{12} & 0 \\ 0 & g_{22} \end{bmatrix},$$

which is adjustable by the user, among the gains L to the output of the first adding unit 601 and outputs the result. A first integration unit 607 integrates the output of the third gain applying unit 606 to output an estimated counter electromotive force $\hat{E}^e_{dqs}$.

A second adding unit 604 calculates a difference between the outputs of the first and second gain applying units 602 and 603, and a third adding unit 605 adds an output of the second adding unit 604 to $(v_{dqs}^e - R_s i_{dqs}^e)$. A fourth adding unit 609 calculates a difference between an output of the third adding unit 605 and the estimated counter electromotive force which is the output of the first integration unit 607.

A fourth gain applying unit 612 applies a gain $$J\hat{\omega}_r = \begin{bmatrix} 0 & -\hat{\omega}_r \\ \hat{\omega}_r & 0 \end{bmatrix}$$

to an estimated state variable $\hat{x}^e_{dqs}$, and a fifth adding unit 610 calculates a difference between an output of the fourth adding unit 609 and an output of the fourth gain applying unit 612. Thereafter, a second integration unit 611 integrates the calculated difference to output an estimated state variable $\hat{x}^e_{dqs}$.

In such a sensorless vector control system for a permanent magnet synchronous machine, a counter electromotive force estimation unit such as a counter electromotive force observer is used and performance of such a counter electromotive force estimation unit is superior in a medium-high speed region in which a counter electromotive force is large, but there is a problem in that voltage information is insufficient in a low speed region in which a counter electromotive force is small so that the performance is degraded.

SUMMARY

It is a technical object to be addressed by the present disclosure to provide a sensorless control system for a permanent magnet synchronous machine, which is capable of maintaining superior performance in low and high regions.

To address the above described technical object, a sensorless control system for a permanent magnet synchronous machine according to one embodiment of the present disclosure includes a counter electromotive force estimation unit configured to estimate a counter electromotive force of a permanent magnet synchronous machine using a phase current, which is applied from an inverter to the permanent magnet synchronous machine, and a phase voltage reference, which is applied to the inverter; and a speed estimation unit configured to estimate an angular velocity and an electrical angle of a rotor of the permanent magnet synchronous machine using the estimated counter electromotive force that is estimated in the counter electromotive force estimation unit, and the counter electromotive force estimation unit may determine a state variable using the phase current that is measured from an output of the inverter.

In one embodiment of the present disclosure, the counter electromotive force estimation unit may determine the estimated counter electromotive force using $$p\begin{bmatrix}\hat{x}^e_{dqs}\\\hat{E}^e_{dqs}\end{bmatrix}=\begin{bmatrix}-J\hat{\omega}_r & -I\\ 0 & 0\end{bmatrix}\begin{bmatrix}\hat{x}^e_{dqs}\\\hat{E}^e_{dqs}\end{bmatrix}+\begin{bmatrix}I\\0\end{bmatrix}(v^e_{dqs}-R_s i^e_{dqs})+$$

$$L(x^e_{dqs}-\hat{x}^e_{dqs})-\begin{bmatrix}0 & K_1\\ 0 & K_2\end{bmatrix}\begin{bmatrix}\hat{x}^e_{dqs}\\\hat{E}^e_{dqs}\end{bmatrix},$$

wherein $K_1=\begin{bmatrix}-1 & 0\\ 0 & 0\end{bmatrix}$, $K_2=\begin{bmatrix}\frac{1}{T_s} & 0\\ 0 & 0\end{bmatrix}$, $x_{dqs}^e$ may be a state variable, $\hat{x}^e_{dqs}$ may be an estimated state variable, and $\hat{E}^e_{dqs}$ may be the estimated counter electromotive force. Also, $\hat{\omega}_r$ may be the estimated angular velocity of the permanent magnet synchronous machine, Rs may be phase resistance of the permanent magnet synchronous machine, $$L=\begin{bmatrix}\frac{1}{T_s} & \hat{\omega}_r\\ -\hat{\omega}_r & \frac{1}{T_s}\\ -g_{21} & 0\\ 0 & -g_{22}\end{bmatrix},$$

Ts is a sampling time of the sensorless control system, and $g_{21}$ and $g_{22}$ may be adjustable gains.

In one embodiment of the present disclosure, the estimated state variable $x_{dqs}^e$ may be a magnetic flux component that is configured with a product of inductance and a current.

In one embodiment of the present disclosure, the counter electromotive force estimation unit may determine the estimated counter electromotive force using $$p\begin{bmatrix}\hat{x}^e_{dqs}\\\hat{E}^e_{dqs}\end{bmatrix}=\begin{bmatrix}-J\hat{\omega}_r & -I\\ 0 & 0\end{bmatrix}\begin{bmatrix}\hat{x}^e_{dqs}\\\hat{E}^e_{dqs}\end{bmatrix}+\begin{bmatrix}I\\0\end{bmatrix}(v^e_{dqs}-R_s i^e_{dqs})+$$

$$L(x^e_{dqs}-\hat{x}^e_{dqs})-\begin{bmatrix}0 & (1-K_{obs})K_1\\ 0 & (1-K_{obs})K_2\end{bmatrix}\begin{bmatrix}\hat{x}^e_{dqs}\\\hat{E}^e_{dqs}\end{bmatrix}.$$

At this point, $$L=\begin{bmatrix}K_{obs}g_{11}+(1-K_{obs})\frac{1}{T_s} & \hat{\omega}_r\\ -\hat{\omega}_r & K_{obs}g_{12}+(1-K_{obs})\frac{1}{T_s}\\ -g_{21} & 0\\ 0 & -g_{22}\end{bmatrix}$$

and $K_{obs}$ may be a weighted value in a range of 0 to 1.

In one embodiment of the present disclosure, the weighted value $K_{obs}$ may be determined by comparing the estimated angular velocity with a reference angular velocity.

In one embodiment of the present disclosure, the weighted value $K_{obs}$ may be a value in a range of 0 to 1.

In one embodiment of the present disclosure, a counter electromotive force estimation unit may include a proportional controller configured to apply a proportional gain to an error (that is, an estimated error) between an actual angle and an estimated angle using the estimated counter electromotive force; an integral controller configured to apply an integral gain to the estimated error; a first calculation unit configured to add an integration result of an output of the integral controller to a feed-forward term that is determined using a q-axis estimated counter electromotive force and a counter electromotive force constant of the permanent magnet synchronous machine; a second calculation unit configured to add an output of the first calculation unit to an output of the proportional controller; an integration unit configured to integrate an output of the second calculation unit to output the estimated angle; and a filter unit configured to perform a low pass filtering on the output of the second calculation unit to output the estimated angular velocity.

In one embodiment of the present disclosure, the feed-forward term may be determined by $$\frac{\hat{E}^e_{qs}}{\lambda_{PM}},$$

wherein $\hat{E}_{qs}^e$ may be the q-axis estimated counter electromotive force and $\lambda_{PM}$ may be the counter electromotive force constant.

In accordance with the present disclosure, a counter electromotive force estimation unit, which is configured in a hybrid form in which a counter electromotive force estimation unit performing robust performance at a low speed and a conventional counter electromotive force estimation unit performing robust performance at a high speed are mixed, is provided so that there is an effect in which a counter electromotive force is exactly estimated at both the low speed and the high speed and thus a position and a speed of a rotor are estimated.

Also, position and speed information may be obtained from error information of a rotor position using a speed estimation unit which is simply configurable.

DETAILED DESCRIPTION

Figure 1:
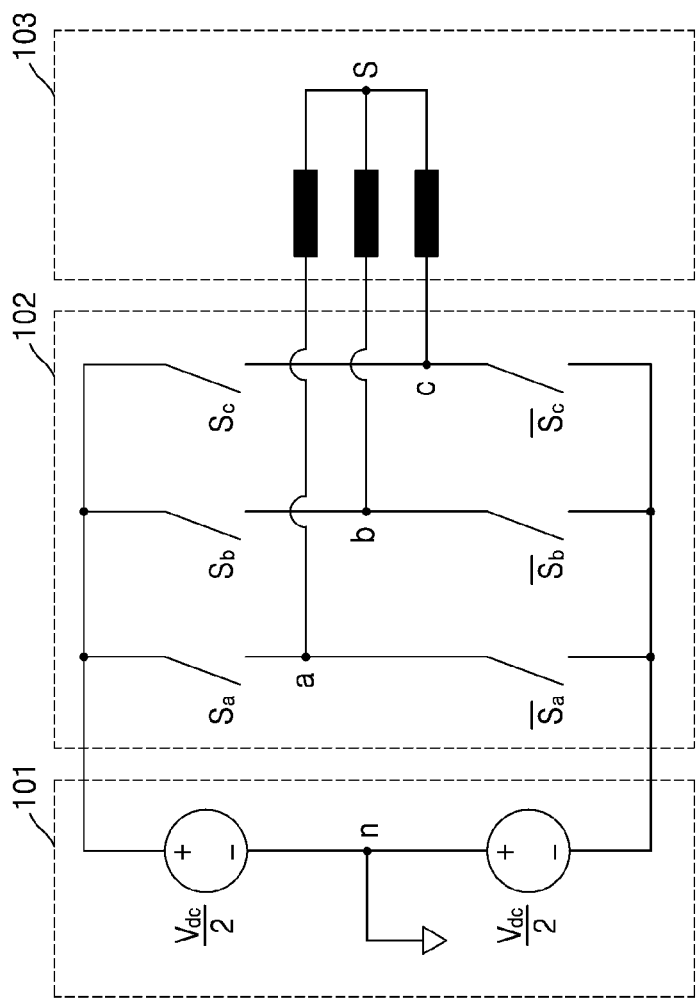
FIG. 1 is a schematically circuit diagram of a 2-level three-phase voltage source inverter used for driving a machine.
Figure 2:
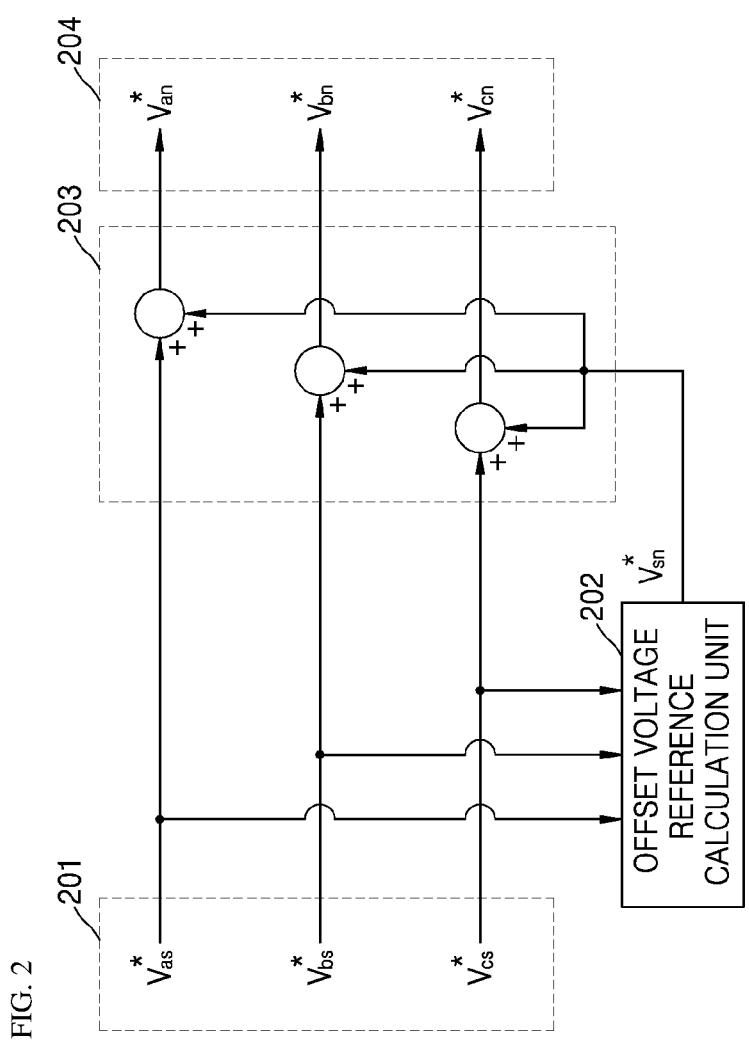
FIG. 2 is a diagram for describing a pole voltage that is applied to a triangular wave comparison voltage modulation for controlling three-phase power switches of an inverter.
Figure 3:
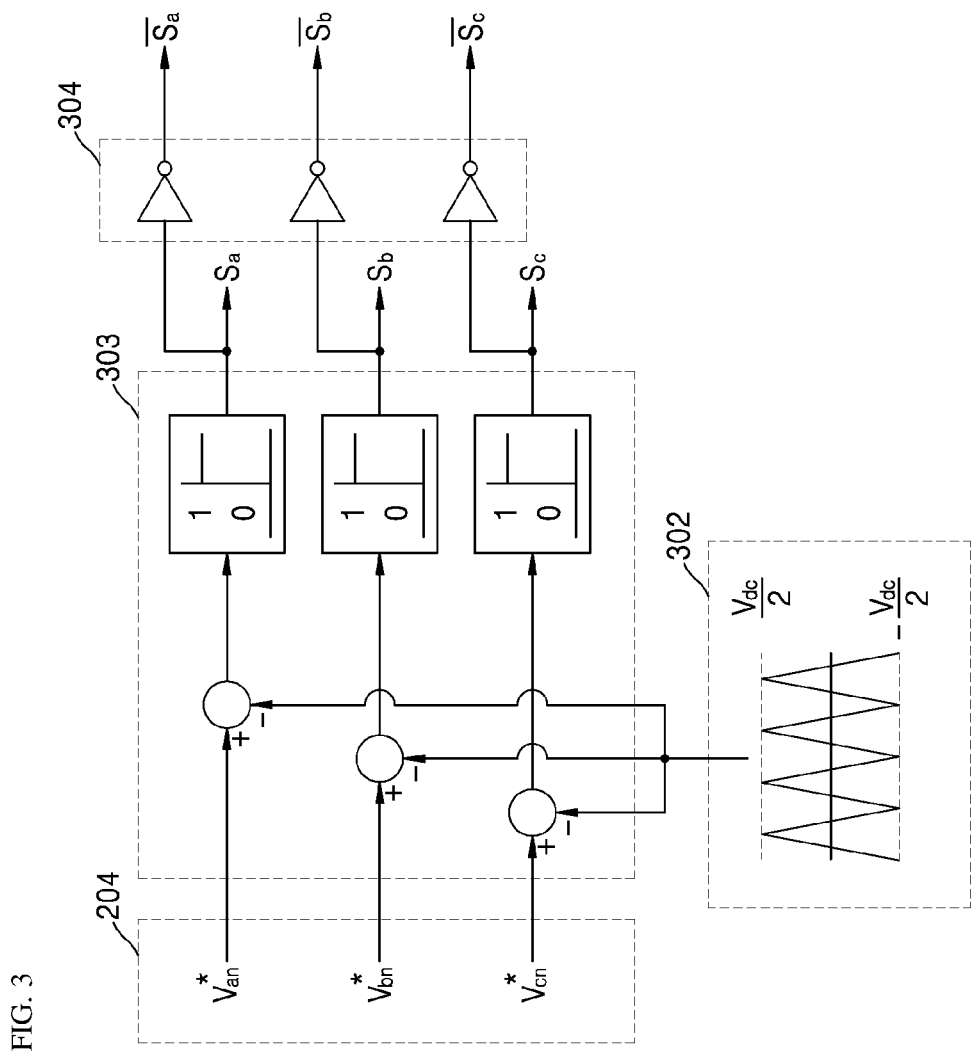
FIG. 3 is an exemplified diagram for describing the triangular wave comparison voltage modulation.
Figure 4:
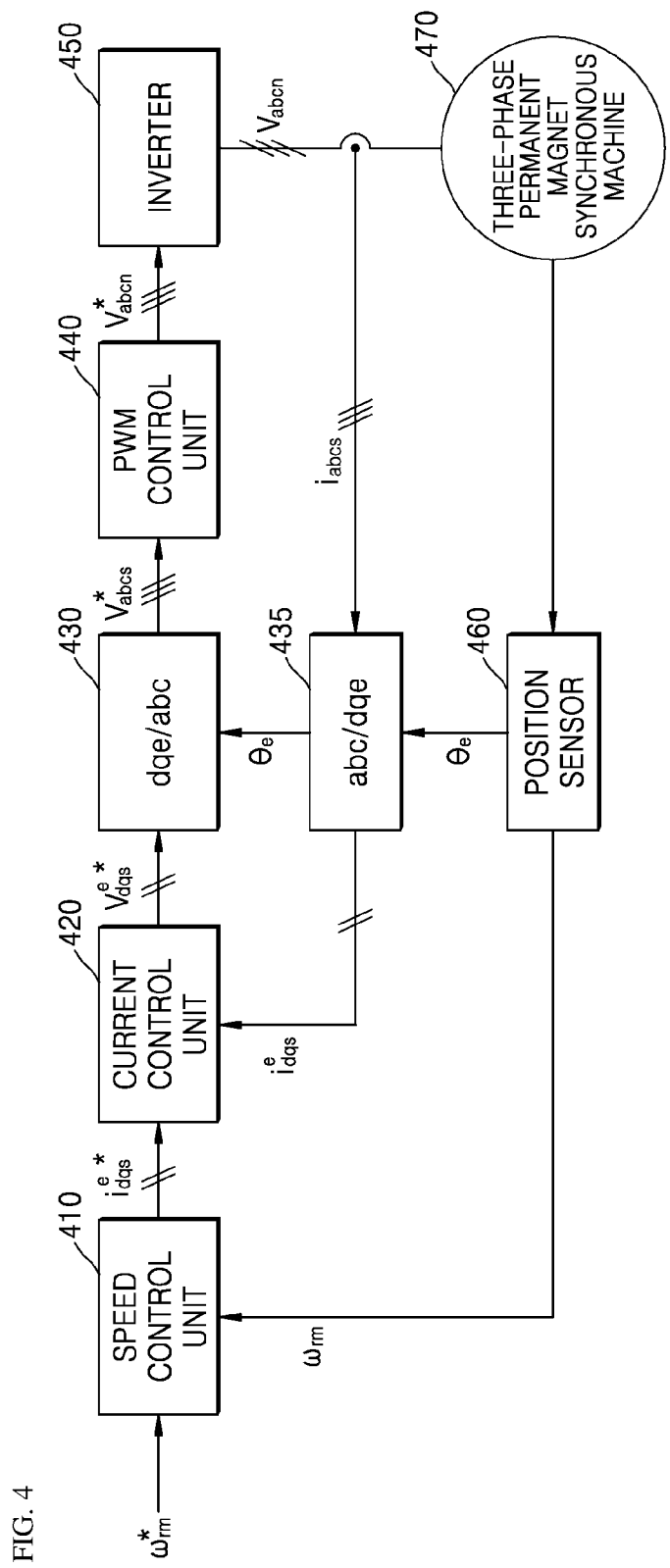
FIG. 4 is a configuration diagram for describing a conventional control system for a permanent magnet synchronous machine.
Figure 5:
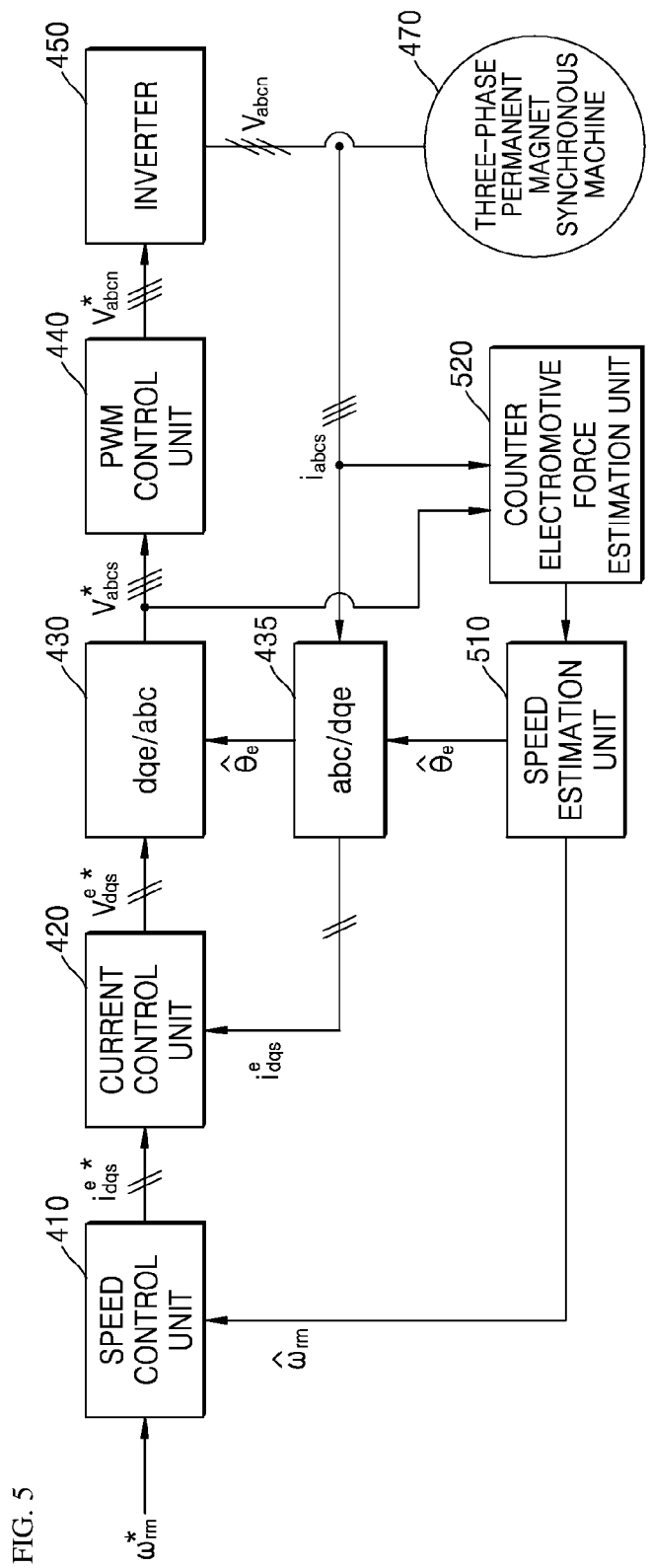
FIG. 5 is a configuration diagram for describing a conventional sensorless control system for a permanent magnet synchronous machine.

The present disclosure may be modified in various forms and may have a variety of embodiments, and, therefore, specific embodiments will be illustrated in the drawings and a description thereof will be described in the following detailed description. The embodiments to be disclosed below, however, are not to be taken in a sense which limits the present disclosure to specific embodiments, and it should be construed to include modification, equivalents, or substitutes within the spirit and technical scope of the present disclosure.

On the basis of Equation 12 that is an equation of a conventional counter electromotive force estimation unit, the inventors of the present disclosure suggest the following principles so as to secure robust performance at a low speed.

1. An actually measured current is used upon estimation of a state variable instead of an estimated current. Using the actually measured current, an error resulting from a feedback may be reduced.

2. To solve instability due to integral calculus, a d-axis counter electromotive force component, which is used in each of actual calculations, is not integrated.

3. To reduce a reflection of a counter electromotive force component error due to insufficient voltage information at a low speed, the d-axis counter electromotive force component, which is related to each of the actual calculations, is not used upon estimation of a d-axis magnetic flux.

An equation of a counter electromotive force estimation unit, to which the above described principles are reflected, is as follows.

$$p\begin{bmatrix} L_{ds}\hat{i}^e_{ds} \\ L_{qs}\hat{i}^e_{qs} \\ \hat{E}^e_{ds} \\ \hat{E}^e_{qs} \end{bmatrix} = \begin{bmatrix} 0 & \hat{\omega}_r & 0 & 0 \\ -\hat{\omega}_r & 0 & 0 & -1 \\ 0 & 0 & -\frac{1}{T_s} & 0 \\ 0 & 0 & 0 & 0 \end{bmatrix}\begin{bmatrix} L_{ds}\hat{i}^e_{ds} \\ L_{qs}\hat{i}^e_{qs} \\ \hat{E}^e_{ds} \\ \hat{E}^e_{qs} \end{bmatrix} + $$ [Equation 14]

$$\begin{bmatrix} 1 & 0 \\ 0 & 1 \\ 0 & 0 \\ 0 & 0 \end{bmatrix}\begin{bmatrix} v^e_{ds} - R_s i^e_{ds} \\ v^e_{qs} - R_s i^e_{qs} \end{bmatrix} + \begin{bmatrix} \frac{1}{T_s} & \hat{\omega}_r \\ -\hat{\omega}_r & \frac{1}{T_s} \\ -g_1 & 0 \\ 0 & -g_2 \end{bmatrix}\left(\begin{bmatrix} L_{ds}i^e_{ds} \\ L_{qs}i^e_{qs} \end{bmatrix} - \begin{bmatrix} L_{ds}\hat{i}^e_{ds} \\ L_{qs}\hat{i}^e_{qs} \end{bmatrix}\right)$$

In Equation 14, a gain L of an observer is as follows.

$$L = \begin{bmatrix} \frac{1}{T_s} & \hat{\omega}_r \\ -\hat{\omega}_r & \frac{1}{T_s} \\ -g_{21} & 0 \\ 0 & -g_{22} \end{bmatrix}$$ [Equation 15]

Here, Ts indicates a sampling time of a sensorless control system according to one embodiment of the present disclosure, and $g_{21}$ and $g_{22}$ indicate gains which are adjustable by a user.

Meanwhile, when Equation 14 is arranged, it may be configured as follows using the full-order observer of Equation 12 and gains $K_1$ and $K_2$.

$$p\begin{bmatrix} \hat{x}^e_{dqs} \\ \hat{E}^e_{dqs} \end{bmatrix} = \begin{bmatrix} -J\hat{\omega}_r & -I \\ 0 & 0 \end{bmatrix}\begin{bmatrix} \hat{x}^e_{dqs} \\ \hat{E}^e_{dqs} \end{bmatrix} + \begin{bmatrix} I \\ 0 \end{bmatrix}(v^e_{dqs} - R_s i^e_{dqs}) + $$ [Equation 16]

$$L(x^e_{dqs} - \hat{x}^e_{dqs}) - \begin{bmatrix} 0 & K_1 \\ 0 & K_2 \end{bmatrix}\begin{bmatrix} \hat{x}^e_{dqs} \\ \hat{E}^e_{dqs} \end{bmatrix}$$

At this point, $K_1$ and $K_2$ are as follows.

$$K_1 = \begin{bmatrix} -1 & 0 \\ 0 & 0 \end{bmatrix}$$ [Equation 17]

$$K_2 = \begin{bmatrix} \frac{1}{T_s} & 0 \\ 0 & 0 \end{bmatrix}$$

Therefore, using such characteristics in one embodiment of the present disclosure, a sensorless control system implementing robust performance at a low speed is proposed by modifying some portion of a conventional sensorless control system that has been used.

That is, one embodiment of the present disclosure configures a gain of a counter electromotive force estimation unit with Equation 15 and adds a feed-forward term in the form of Equation 16 to a structure of the conventional counter electromotive force estimation unit, thereby improving performance at a low speed.

Hereinafter, one preferred embodiment according to the present disclosure will be described in detail with reference to the accompanying drawings.

Figure 7:
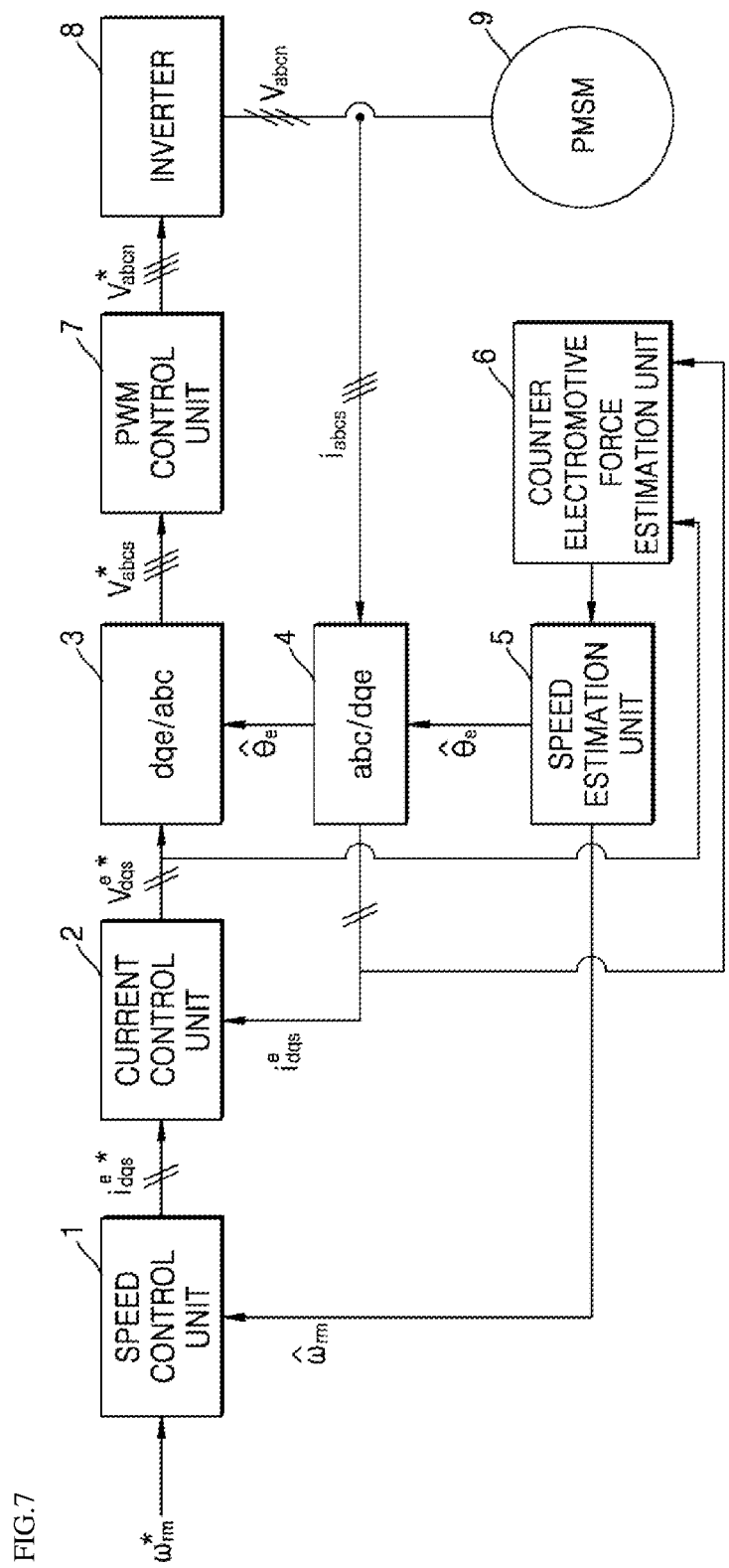
FIG. 7 is a configuration diagram of a sensorless control system for a permanent magnet synchronous machine according to one embodiment of the present disclosure.

FIG. 7 is a configuration diagram of a sensorless control system for a permanent magnet synchronous machine according to one embodiment of the present disclosure.

As shown in the drawing, the sensorless control system according to one embodiment of the present disclosure may include a speed control unit 1, a current control unit 2, conversion units 3 and 4, a speed estimation unit 5, a counter electromotive force estimation unit 6, a PWM control unit 7, and an inverter 8, and an output of the inverter 8 may be applied to a permanent magnet synchronous machine 9.

The speed estimation unit 5 estimates an angular velocity and an electrical angle based on a counter electromotive force that is estimated from the counter electromotive force estimation unit 6, and the counter electromotive force estimation unit 6 estimates the counter electromotive force using phase voltage references and phase currents.

The speed control unit 1 may output current references using a speed estimated by the speed estimation unit 5 and a speed reference of the permanent magnet synchronous machine 9. The speed control unit 2 may receive the current references and output voltage references using dq-axis currents, which are converted in a synchronous reference frame, of the permanent magnet synchronous machine 9. The conversion unit 3 may convert the voltage references in the synchronous reference frame into abc-axis physical amounts.

Each of the conversion units 3 and 4 may perform a reference frame transformation using an electrical angle that is estimated by the speed estimation unit 5.

The PWM control unit 7 may convert abc-phase voltage references into pole voltage references and apply the pole voltage references to the inverter 8, and the inverter 8 may synthesize the pole voltage references to pole voltages and apply the pole voltages to the permanent magnet synchronous machine 9.

Figure 8:
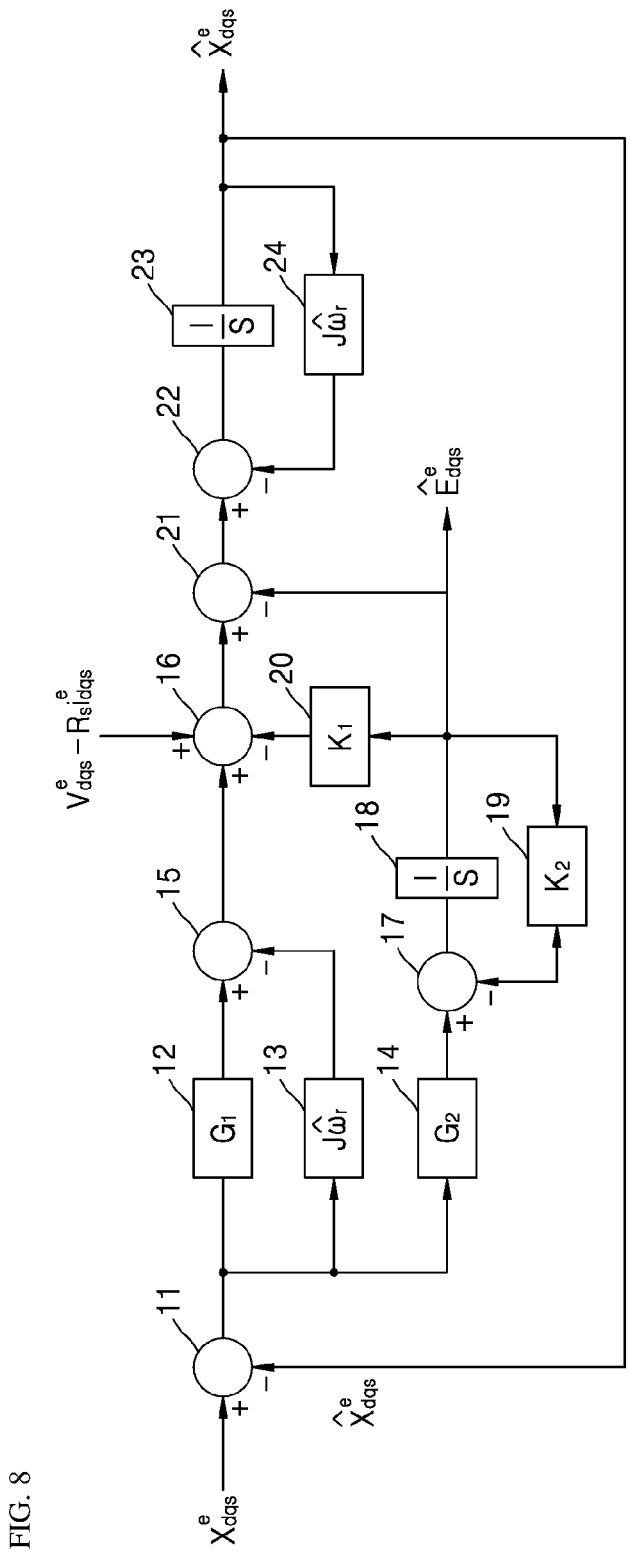
FIG. 8 is a detailed configuration diagram of a counter electromotive force estimation unit of FIG. 7 according to one embodiment of the present disclosure.

FIG. 8 is a detailed configuration diagram of the counter electromotive force estimation unit 6 of FIG. 7 according to one embodiment of the present disclosure.

As shown in the drawing, the counter electromotive force estimation unit 6 according to one embodiment of the present disclosure may include a first adding unit 11, a first gain applying unit 12, a second gain applying unit 13, a third gain applying unit 14, a second adding unit 15, a third adding unit 16, a fourth adding unit 17, a first integration unit 18, a fourth gain applying unit 19, a fifth gain applying unit 20, a fifth adding unit 21, a sixth adding unit 22, a second integration unit 23, and a sixth gain applying unit 24.

The first adding unit 11 may determine a difference between a state variable $x_{dqs}^{e}$ and an estimated state variable $\hat{x}_{dqs}$. The first gain applying unit 12 may apply a gain $$T_s = \begin{bmatrix} \frac{1}{T_s} & 0 \\ 0 & \frac{1}{T_s} \end{bmatrix},$$

which is related to a sampling time, among gains L to an output $(x_{dqs}^{e} - \hat{x}_{dqs})$ of the first adding unit 11. The second gain applying unit 13 may apply $$J\hat{\omega}_r = \begin{bmatrix} 0 & -\hat{\omega}_r \\ \hat{\omega}_r & 0 \end{bmatrix}$$

among the gains L to the output $(x_{dqs}^{e} - \hat{x}_{dqs})$ of the first adding unit 11. Also, the third gain applying unit 14 may apply a gain $$G_1 = \begin{bmatrix} g_{11} & 0 \\ 0 & g_{12} \end{bmatrix},$$

which is adjustable by a user, among the gains L to the output $(x_{dqs}^{e} - \hat{x}_{dqs})$ of the first adding unit 11.

The second adding unit 15 may calculate a difference between an output of the first gain applying unit 12 and an output of the second gain applying unit 13.

Meanwhile, the fourth adding unit 17 may subtract a gain $K_2$ applied by the fourth gain applying unit 19 from a counter electromotive force $\hat{E}_{dqs}$ that is estimated based on an output of the third gain applying unit 14. That is, the fourth adding unit 17 may subtract $K_2 \hat{E}_{dqs}$ from the output of the third gain applying unit 14.

The first integration unit 18 may integrate an output of the fourth adding unit 17 to output the estimated counter electromotive force $\hat{E}_{dqs}$.

The fifth gain applying unit 20 may apply a gain $K_1$ to the estimated counter electromotive force that is the output of the first integration unit 18. That is, $K_1 \hat{E}_{dqs}$ may be output.

The third adding unit 16 may subtract an output of the fifth gain applying unit 20 from an output of the second adding unit 15, and add $(v_{dqs}^{e} - R_s i_{dqs}^{e})$, that is, it is obtained by subtracting a product of phase resistance and a current of the permanent magnet synchronous machine from a voltage. The fifth adding unit 21 may subtract the counter electromotive force that is estimated based on the output of the third adding unit 16. The sixth adding unit 22 may subtract an output of the sixth gain applying unit 24 from an output of the fifth adding unit 21. The sixth gain applying unit 24 may apply the gain $$J\hat{\omega}_r = \begin{bmatrix} 0 & -\hat{\omega}_r \\ \hat{\omega}_r & 0 \end{bmatrix}$$

to the estimated state variable $\hat{x}_{dqs}$, thereby outputting $-J\hat{\omega}_r \hat{x}_{dqs}$. The second integration unit 23 may add an output of the sixth adding unit 22, thereby outputting the estimated state variable $\hat{x}_{dqs}$.

Figure 6:
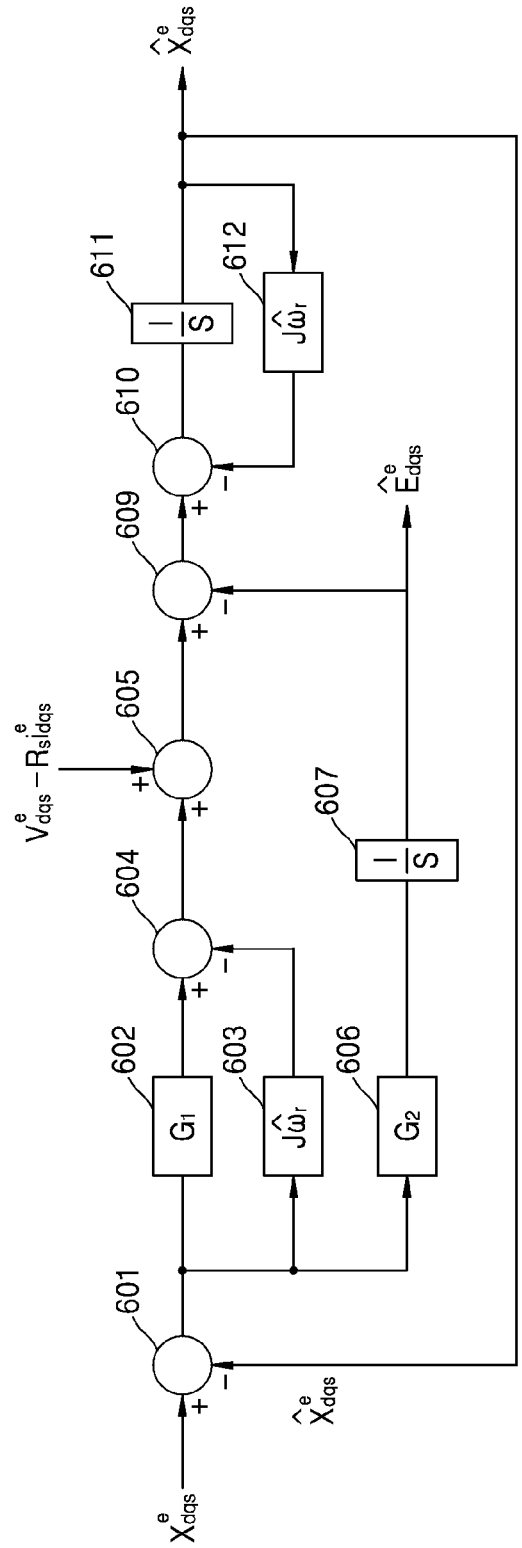
FIG. 6 is a detailed configuration diagram of a counter electromotive force estimation unit in the form of a conventional Luenberger observer.

That is, it can be seen that the counter electromotive force estimation unit 6 according to one embodiment of the present disclosure is configured with an observer gain the same as that of Equation 15 in the conventional configuration of FIG. 6 and by adding a feed-forward term to the conventional observer structure.

Meanwhile, as described above, the counter electromotive force estimation unit 6 according to one embodiment of the present disclosure is provided for the purpose of improving performance at the low speed. Hereinafter, a counter electromotive force estimation unit, which is mixed with a conventional counter electromotive force estimation unit implementing superior performance at a high speed and the counter electromotive force estimation unit 6 according to one embodiment of the present disclosure, according to another embodiment is proposed.

Figure 9:
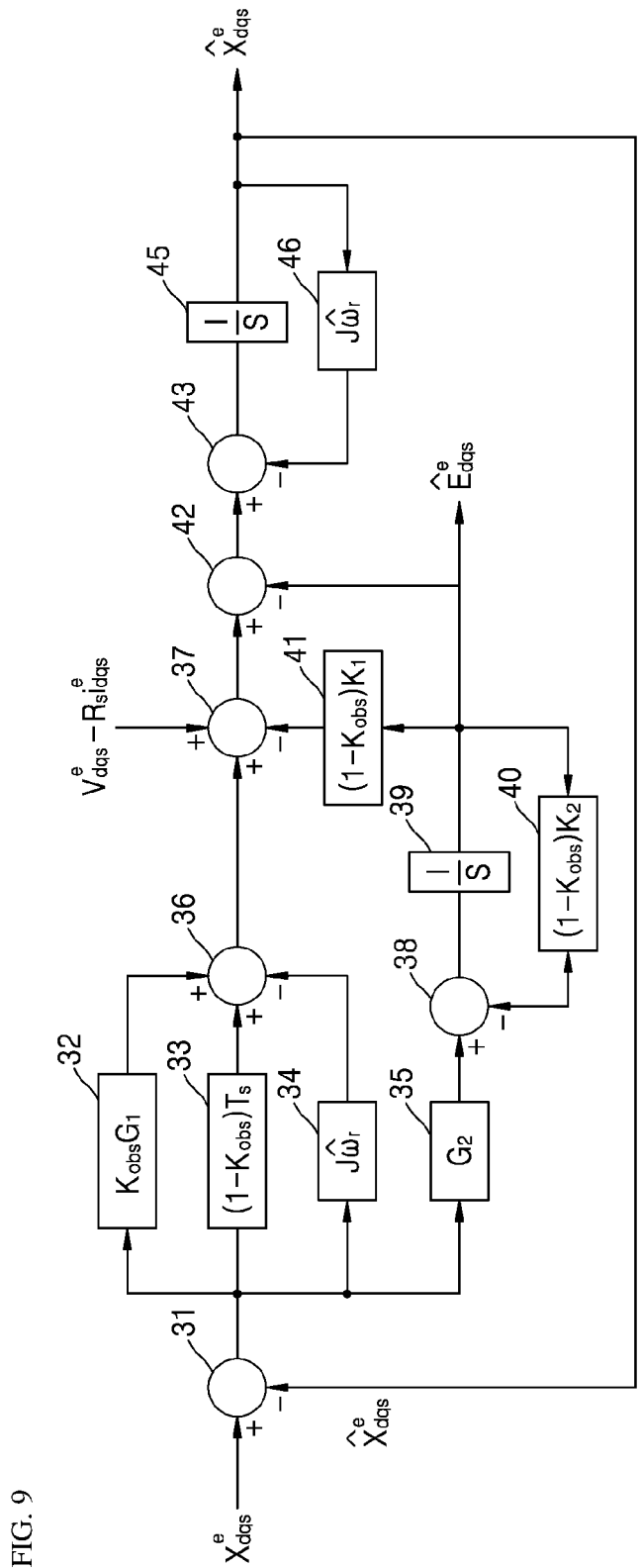
FIG. 9 is a detailed configuration diagram for describing a counter electromotive force estimation unit of FIG. 7 according to another embodiment of the present disclosure.

FIG. 9 is a detailed configuration diagram for describing a counter electromotive force estimation unit of FIG. 7 according to another embodiment of the present disclosure.

An observer of the conventional counter electromotive force estimation unit may be the same as Equation 12, and an observer of the counter electromotive force estimation unit of the present disclosure may be represented as Equation 16. Each of the observers is as follows.

$$p\begin{bmatrix} \hat{x}^{\hat{e}}_{dqs} \\ \hat{E}^{\hat{e}}_{dqs} \end{bmatrix} = \begin{bmatrix} -J\hat{\omega}_r & -I \\ 0 & 0 \end{bmatrix}\begin{bmatrix} \hat{x}^{\hat{e}}_{dqs} \\ \hat{E}^{\hat{e}}_{dqs} \end{bmatrix} + \begin{bmatrix} I \\ 0 \end{bmatrix}(v^e_{dqs} - R_s i^e_{dqs}) + L(x^e_{dqs} - \hat{x}^{\hat{e}}_{dqs})$$

$$p\begin{bmatrix} \hat{x}^{\hat{e}}_{dqs} \\ \hat{E}^{\hat{e}}_{dqs} \end{bmatrix} = \begin{bmatrix} -J\hat{\omega}_r & -I \\ 0 & 0 \end{bmatrix}\begin{bmatrix} \hat{x}^{\hat{e}}_{dqs} \\ \hat{E}^{\hat{e}}_{dqs} \end{bmatrix} + \begin{bmatrix} I \\ 0 \end{bmatrix}(v^e_{dqs} - R_s i^e_{dqs}) +$$

$$L(x^e_{dqs} - \hat{x}^{\hat{e}}_{dqs}) - \begin{bmatrix} 0 & K_1 \\ 0 & K_2 \end{bmatrix}\begin{bmatrix} \hat{x}^{\hat{e}}_{dqs} \\ \hat{E}^{\hat{e}}_{dqs} \end{bmatrix}$$

A difference between the Equations 12 and 16 is whether or not a term $$-\begin{bmatrix} 0 & K_1 \\ 0 & K_2 \end{bmatrix}\begin{bmatrix} \hat{x}^{\hat{e}}_{dqs} \\ \hat{E}^{\hat{e}}_{dqs} \end{bmatrix}$$

exists so that it may be simply switched to the following Equation using a weighed value $K_{obs}$.

$$p\begin{bmatrix} \hat{x}^{\hat{e}}_{dqs} \\ \hat{E}^{\hat{e}}_{dqs} \end{bmatrix} = \begin{bmatrix} -J\hat{\omega}_r & -I \\ 0 & 0 \end{bmatrix}\begin{bmatrix} \hat{x}^{\hat{e}}_{dqs} \\ \hat{E}^{\hat{e}}_{dqs} \end{bmatrix} + \begin{bmatrix} I \\ 0 \end{bmatrix}(v^e_{dqs} - R_s i^e_{dqs}) + \quad \text{[Equation 18]}$$

$$L(x^e_{dqs} - \hat{x}^{\hat{e}}_{dqs}) - \begin{bmatrix} 0 & (1-K_{obs})K_1 \\ 0 & (1-K_{obs})K_2 \end{bmatrix}\begin{bmatrix} \hat{x}^{\hat{e}}_{dqs} \\ \hat{E}^{\hat{e}}_{dqs} \end{bmatrix}$$

For example, it can be seen that the counter electromotive force estimation unit according to another embodiment is the same as the counter electromotive force estimation unit, which shows robust performance at a low speed, of FIG. 8 when $K_{obs}$ is 0, and is the same as the counter electromotive force estimation unit, which shows robust performance at a high speed, of FIG. 6 when $K_{obs}$ is 1.

Meanwhile, an observer gain of the conventional counter electromotive force estimation unit of FIG. 6 may be represented as Equation 13, and an observer gain of the counter electromotive force estimation unit of FIG. 8 may be represented as Equation 15. Each of the two observer gains is as follows.

$$L = \begin{bmatrix} g_{11} & \hat{\omega}_r \\ -\hat{\omega}_r & g_{12} \\ -g_{21} & 0 \\ 0 & -g_{22} \end{bmatrix} \quad L = \begin{bmatrix} \frac{1}{T_s} & \hat{\omega}_r \\ -\hat{\omega}_r & \frac{1}{T_s} \\ -g_{21} & 0 \\ 0 & -g_{22} \end{bmatrix}$$

A difference between the two observer gains is $$\begin{bmatrix} g_{11} & \hat{\omega}_r \\ -\hat{\omega}_r & g_{12} \end{bmatrix} \text{ and } \begin{bmatrix} \frac{1}{T_s} & \hat{\omega}_r \\ -\hat{\omega}_r & \frac{1}{T_s} \end{bmatrix}$$

among gains. Therefore, it may be switchable using the weighted value $K_{obs}$. That is, using the weighted value $K_{obs}$, a hybrid type observer gain may be set as follows.

$$L = \begin{bmatrix} K_{obs}g_{11} + (1-K_{obs})\frac{1}{T_s} & \hat{\omega}_r \\ -\hat{\omega}_r & K_{obs}g_{12} + (1-K_{obs})\frac{1}{T_s} \\ -g_{21} & 0 \\ 0 & -g_{22} \end{bmatrix} \quad \text{[Equation 19]}$$

For example, it can be seen that the observer gain of the counter electromotive force estimation unit according to another embodiment is the same as that of the counter electromotive force estimation unit, which shows the robust performance at the low speed, of FIG. 8 when $K_{obs}$ is 0, and is the same as that of the counter electromotive force estimation unit, which shows the robust performance at the high speed, of FIG. 6 when $K_{obs}$ is 1.

FIG. 9 shows a modified counter electromotive force estimation unit to which the described above is reflected.

As shown in the drawing, the counter electromotive force estimation unit 6 according to one embodiment of the present disclosure may include a first adding unit 31, a first gain applying unit 32, a second gain applying unit 33, a third gain applying unit 34, a fourth gain applying unit 35, a second adding unit 36, a third adding unit 37, a fourth adding unit 38, a first integration unit 39, a fifth gain applying unit 40, a sixth gain applying unit 41, a fifth adding unit 42, a sixth adding unit 43, a second integration unit 45, and a seventh gain applying unit 46.

Outputs of the counter electromotive force estimation unit 6 of the present disclosure are an estimated counter electromotive force and an estimated state variable, and the counter electromotive force estimation unit 6 is the same as the counter electromotive force estimation unit, which shows the robust performance at the low speed, of FIG. 8 when the weighted value $K_{obs}$ is 0 and is the same as the conventional counter electromotive force estimation unit, which shows the robust performance at the high speed, of FIG. 6 when the weighted value $K_{obs}$ is 1.

Figure 10:
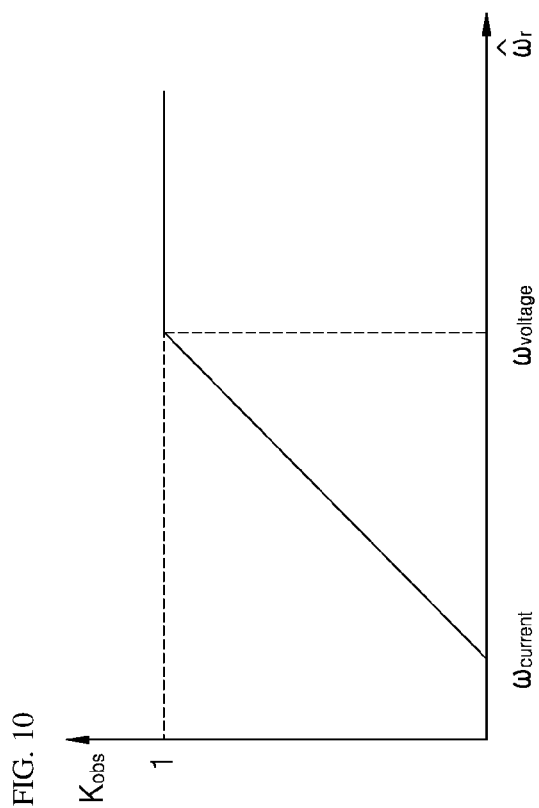
FIG. 10 is one exemplified diagram for describing a method of determining a weighted value.

FIG. 10 is one exemplified diagram for describing a method of determining a weighted value according to one embodiment of the present disclosure.

As shown in the drawing, in one embodiment of the present disclosure, the weighted value $K_{obs}$ may be zero until an estimated angular velocity reaches $\omega_{current}$, and in this case, the counter electromotive force estimation unit may be the same as the counter electromotive force estimation unit of FIG. 8.

The weighted value $K_{obs}$ is gradually increased when the estimated angular velocity is equal to or greater than $\omega_{current}$, and it becomes 1 when the estimated angular velocity is equal to or greater than $\omega_{voltage}$ so that the counter electromotive force estimation unit may be the same as the counter electromotive force estimation unit of FIG. 6. That is, it can be seen that the counter electromotive force estimation unit of FIG. 8 dominantly acts at the low speed, and the counter electromotive force estimation unit of FIG. 6 dominantly acts at the high speed.

Figure 11:
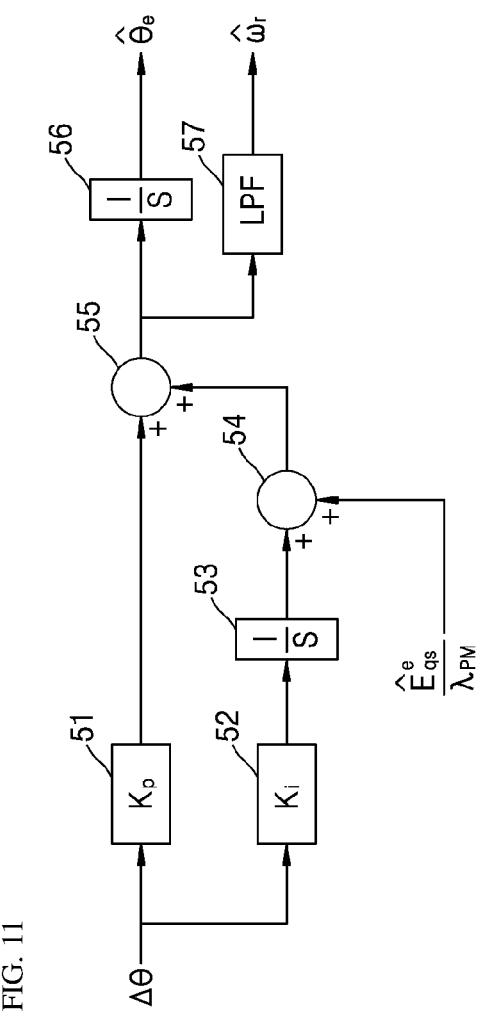
FIG. 11 is a detailed configuration diagram of a speed estimation unit of FIG. 7 according to one embodiment of the present disclosure.

FIG. 11 is a detailed configuration diagram of the speed estimation unit of FIG. 7 according to one embodiment of the present disclosure.

As shown in the drawing, the speed estimation unit 5 according to one embodiment office procedure automation system may include a proportional controller 51, an integral controller 52, a first integration unit 53, a first adding unit 54, a second adding unit 55, a second integration unit 56, and a low pass filter (LPF) 57.

An input of the proportional controller 51 is an error (that is, an estimated error) between an actual angle and an estimated angle, and it may be calculated as follows using the counter electromotive force that is estimated in the counter electromotive force estimation unit 6.

$$\Delta\theta \approx -\frac{\hat{E}_{ds}^e}{E}\text{sgn}(\hat{\omega}_r) \quad \text{[Equation 20]}$$

Here, E may be calculated as follows, and 'sgn(x)' refers to a sign of x. That is, 'sgn(x)' is '+' when x is a positive value and is '-' when x is a negative value.

$$E=\sqrt{\hat{E}_{ds}^{e2}+\hat{E}_{ds}^{e2}} \quad \text{[Equation 21]}$$

The proportional controller 51 may apply a proportional gain $K_p$ to the estimated error, and the integral controller 52 may apply an integral gain $K_i$ to the estimated error.

The first integration unit 53 may integrate an output of the integral controller 52, and the first adding unit 54 may add an output of the first integration unit 53 to a feed-forward term $$\frac{\hat{E}_{qs}^e}{\lambda_{PM}}.$$

$\hat{E}_{qs}^e$ may be obtained from the counter electromotive force estimation unit of FIG. 6 or 8, and may correspond to a q-axis estimated counter electromotive force.

The second adding unit 55 may add an output of the first adding unit 54 to an output of the proportional controller 51, and the second integration unit 56 may integrate an output of the second adding unit 55 to output an estimated electrical angle. Also, the LPF 57 may perform a low pass filtering on the output of the second adding unit 55 to output an estimated angular velocity.

In accordance with one embodiment of the present disclosure, a counter electromotive force is estimated through a counter electromotive force estimation unit in the form of a full-order state observer, and position estimation error information of a rotor is determined based on the estimated counter electromotive force such that a sensorless control may be performed.

Also, position and speed information of the rotor may be obtained based on the position estimation error information of the rotor using a speed estimation unit which is simply configurable.

In accordance with the present disclosure, a counter electromotive force estimation unit, which is configured in a hybrid form in which a counter electromotive force estimation unit performing robust performance at a low speed and a conventional counter electromotive force estimation unit performing robust performance at a high speed are mixed, is provided so that a counter electromotive force may be exactly estimated at both the low speed and the high speed and thus a position and a speed of the rotor are estimated.

While the present disclosure has been described with reference to embodiments thereof, the embodiments are merely illustrative and it should be understood that various modifications and equivalent embodiments can be derived by those who skilled in the art. Accordingly, the technical scope of the present disclosure should be determined by the following claims.

What is claimed is:

1. A sensorless control system for a permanent magnet synchronous machine, comprising:
   a counter electromotive force estimation unit configured to estimate a counter electromotive force of the permanent magnet synchronous machine using a current and a first voltage reference, wherein the first voltage reference is converted, by a conversion unit, into a second voltage reference, the second voltage reference is converted, by a control unit, into a third voltage reference, and the third voltage reference is applied from the control unit to an inverter, wherein the third voltage reference is synthesized by the inverter to be applied to the permanent magnet synchronous machine; and
   a speed estimation unit configured to estimate an angular velocity and an electrical angle of a rotor of the permanent magnet synchronous machine using the estimated counter electromotive force that is estimated in the counter electromotive force estimation unit,
   wherein the counter electromotive force estimation unit is configured to:
      determine a state variable based on the current and inductances in a synchronous reference frame, and
      estimate the counter electromotive force based on a weighted value, the current, and the first voltage reference, wherein the weighted value is determined by comparing the estimated angular velocity with a reference angular velocity,
   wherein the weighted value is a value in a range of 0 to 1,
   wherein the speed estimation unit includes a proportional controller configured to apply a proportional gain to an error between an actual angle and an estimated angle using the estimated counter electromotive force,
   wherein the counter electromotive force estimation unit includes a first integration unit configured to integrate an output of a first adding unit to output the estimated counter electromotive force.

2. The sensorless control system of claim 1, wherein the counter electromotive force estimation unit determines the estimated counter electromotive force using the following Equation, $$p\begin{bmatrix}\hat{x}^e_{dqs} \\ \hat{E}^e_{dqs}\end{bmatrix} = \begin{bmatrix}-J\hat{\omega}_r & -I \\ 0 & 0\end{bmatrix}\begin{bmatrix}\hat{x}^e_{dqs} \\ \hat{E}^e_{dqs}\end{bmatrix} + \begin{bmatrix}I \\ 0\end{bmatrix}(v^e_{dqs} - R_s i^e_{dqs}) +$$

$$L(x^e_{dqs} - \hat{x}^e_{dqs}) - \begin{bmatrix}0 & K_1 \\ 0 & K_2\end{bmatrix}\begin{bmatrix}\hat{x}^e_{dqs} \\ \hat{E}^e_{dqs}\end{bmatrix}$$

wherein, p is a differential operator, $$J=\begin{bmatrix}0 & -1 \\ 1 & 0\end{bmatrix}, I=\begin{bmatrix}1 & 0 \\ 0 & 1\end{bmatrix}, v^e_{dqs}$$

is a dq-axis voltage, $i_{dqs}^e$ is a dq-axis current, $$K_1=\begin{bmatrix}-1 & 0 \\ 0 & 0\end{bmatrix}, K_2=\begin{bmatrix}\frac{1}{T_s} & 0 \\ 0 & 0\end{bmatrix}, x^e_{dqs}$$

is the state variable, $\hat{x}^e_{dqs}$ is an estimated state variable, $\hat{E}^e_{dqs}$ is the estimated counter electromotive force, $\hat{\omega}_r$ is the estimated angular velocity of the permanent magnet synchronous machine, $R_s$ is phase resistance of the permanent magnet synchronous machine, $$L = \begin{bmatrix} \frac{1}{T_s} & \hat{\omega}_r \\ -\hat{\omega}_r & \frac{1}{T_s} \\ -g_{21} & 0 \\ 0 & -g_{22} \end{bmatrix},$$

$T_s$ is a sampling time of the sensorless control system, and $g_{21}$ and $g_{22}$ are adjustable gains.

3. The sensorless control system of claim 2, wherein the estimated state variable $\hat{x}^e_{dqs}$ is a magnetic flux component that is configured with a product of the d-axis and q-axis inductances and the phase currents.

4. The sensorless control system of claim 1, wherein the counter electromotive force estimation unit determines the estimated counter electromotive force using the following Equation, $$p\begin{bmatrix} \hat{x}^e_{dqs} \\ \hat{E}^e_{dqs} \end{bmatrix} = \begin{bmatrix} -J\hat{\omega}_r & -I \\ 0 & 0 \end{bmatrix}\begin{bmatrix} \hat{x}^e_{dqs} \\ \hat{E}^e_{dqs} \end{bmatrix} + \begin{bmatrix} I \\ 0 \end{bmatrix}(v^e_{dqs} - R_s i^e_{dqs}) + L(x^e_{dqs} - \hat{x}^e_{dqs}) - \begin{bmatrix} 0 & (1-K_{obs})K_1 \\ 0 & (1-K_{obs})K_2 \end{bmatrix}\begin{bmatrix} \hat{x}^e_{dqs} \\ \hat{E}^e_{dqs} \end{bmatrix}$$

wherein, p is a differential operator, $$J = \begin{bmatrix} 0 & -1 \\ 1 & 0 \end{bmatrix}, I = \begin{bmatrix} 1 & 0 \\ 0 & 1 \end{bmatrix}, v^e_{dqs}$$

is a dq-axis voltage, $i^e_{dqs}$ is a dq-axis current, $$K_1 = \begin{bmatrix} -1 & 0 \\ 0 & 0 \end{bmatrix}, K_2 = \begin{bmatrix} \frac{1}{T_s} & 0 \\ 0 & 0 \end{bmatrix}, x^e_{dqs}$$

is the state variable, $\hat{x}^e_{dqs}$ is an estimated state variable, $\hat{E}^e_{dqs}$ is the estimated counter electromotive force, $\hat{\omega}_r$ is the estimated angular velocity of the permanent magnet synchronous machine, $R_s$ is phase resistance of the permanent magnet synchronous machine, $$L = \begin{bmatrix} K_{obs}g_{11} + (1-K_{obs})\frac{1}{T_s} & \hat{\omega}_r \\ -\hat{\omega}_r & K_{obs}g_{12} + (1-K_{obs})\frac{1}{T_s} \\ -g_{21} & 0 \\ 0 & -g_{22} \end{bmatrix},$$

$T_s$ is a sampling time of the sensorless control system, and $g_{21}$ and $g_{22}$ are adjustable gains, and $K_{obs}$ is the weighted value.

5. The sensorless control system of claim 1, wherein the speed estimation unit includes:
an integral controller configured to apply an integral gain to the error;
a first calculation unit configured to add an integration result of an output of the integral controller to a feed-forward term that is determined using a q-axis estimated counter electromotive force and a counter electromotive force constant of the permanent magnet synchronous machine;
a second calculation unit configured to add an output of the first calculation unit to an output of the proportional controller;
a second integration unit configured to integrate an output of the second calculation unit to output the estimated angle; and
a filter unit configured to perform a low pass filtering on the output of the second calculation unit to output the estimated angular velocity.

6. The sensorless control system of claim 5, wherein the feed-forward term is determined by $$\frac{\hat{E}^e_{qs}}{\lambda_{PM}},$$

wherein $\hat{E}^e_{qs}$ is the q-axis estimated counter electromotive force and $\lambda_{PM}$ is the counter electromotive force constant.

7. The sensorless control system of claim 1, wherein the counter electromotive force estimation unit further includes:
a second adding unit configured to determine a difference between the state variable and an estimated state variable;
a gain applying unit configured to apply a first gain to an output of the second adding unit; and
the first adding unit configured to subtract a product of a second gain and the estimated counter electromotive force from an output of the gain applying unit.

* * * * *